3,422,092
2 - CARBAMOYL - 2-AZABICYCLO[2.2.2]OCTANES, AND 3 - CARBAMOYL - 3 - AZABICYCLO[3.2.2] NONANES

Robert B. Moffett, Kalamazoo, Mich., assignor to The Upjohn Company, Kalamazoo, Mich., a corporation of Delaware
No Drawing. Filed Feb. 18, 1966, Ser. No. 528,370
U.S. Cl. 260—239        3 Claims
Int. Cl. C07d 57/00; C07d 27/28; C07d 41/00

ABSTRACT OF THE DISCLOSURE

Novel 2-carbamoyl-2-azabicyclo[2.2.2]octanes and 3-carbamoyl-3-azabicyclo[3.2.2]nonanes (useful as central nervous system stimulants and enzyme inhibitors; novel intermediate lower-alkyl 2-azabicyclo[2.2.2]octane-2-carboxylates and lower-alkyl 3-azabicyclo[3.2.2]nonane-3-carboxylates useful as sedatives and diuretic agents; and processes for the preparation thereof.

---

This invention relates to new and useful chemical compounds, intermediates therefor and processes for their production. More particularly this invention relates to 2-carbamoyl-2-azabicyclo[2.2.2]octanes and 3-carbamoyl-3-azabicyclo[3.2.2]nonanes, the intermediate lower-alkyl 2-azabicyclo[2.2.2]octane-2-carboxylates and lower-alkyl 3-azabicyclo[3.2.2]nonane-3-carboxylates, and processes for the preparation thereof.

The novel compounds, intermediates and processes of this invention are represented by the following flow diagram:

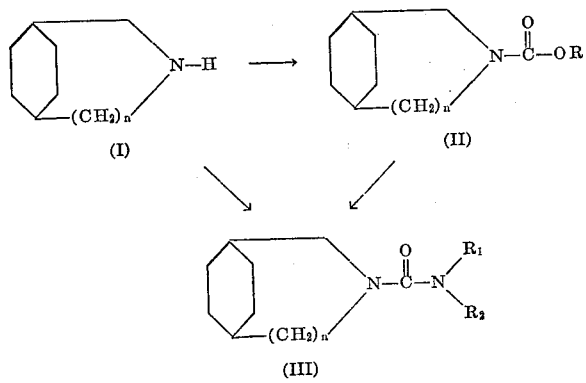

wherein $n$ is 0 or 1, R is lower-alkyl, and $R_1$ and $R_2$ taken separately are each hydrogen or lower-alkyl, and $R_1$ and $R_2$ taken together with —N< constitute a saturated heterocyclic amino radical

of from 5 to 6 ring atoms, inclusive, wherein Z is alkylene, oxadialkylene, or N-lower-alkylazadialkylene.

In this application the term "lower-alkyl" means an alkyl radical of from 1 to 4 carbon atoms, inclusive, such as methyl, ethyl, propyl, butyl and isomeric forms thereof. The term "saturated heterocyclic amino radical

of from 5 to 6 ring atoms, inclusive," includes, for example, pyrrolidino, alkylpyrrolidino such as 2-methylpyrrolidino, 2,2-dimethylpyrrolidino and the like, piperidino, alkylpiperidino such as 2-methylpiperidino, 3-methylpiperidino, 4,4-dimethylpiperidino and the like, alkylpiperazino such as 4-methylpiperazino and the like, morpholino, alkylmorpholino such as 2-methylmorpholino, 3-methylmorpholino and the like.

The novel 2-carbamoyl - 2 - azabicyclo[2.2.2]octanes and 3-carbamoyl-3-azabicyclo[3.2.2]nonanes of Formula III of this invention are central nervous system stimulants and enzyme inhibitors, for example, they are pseudocholinesterase inhibiting agents.

The novel lower-alkyl 2-azabicyclo[2.2.2]octane-2-carboxylates and lower-alkyl 3-azabicyclo[3.2.2]nonane-3-carboxylates of Formula II are sedatives and diuretic agents.

In addition, the novel compounds of Formulae II and III are fungicidal and bactericidal agents and are useful for the treatment of fungal and bacterial infections. For example, they have been shown to be active against the fungi *Trichophyton rubrum*, *Microsporum canis*, *Alternaria solani*, *Fusarium oxysporum* and *Asperigillus flavus* and the bacteria *Bacillus subtilis*, *Serratia marcescens*, *Aerobacter aerogenes*, *Pseudomonas fluorescens*, *Klebsiella pneumoniae*, *Salmonella gallinarum* and *Mycobacterium phlei*.

The novel compounds of Formulae II and III are useful in the treatment of animals and birds, and are particularly useful in the treatment of humans and valuable domestic animals. They can be administered in conventional dosage forms, such as pills, tablets, capsules, syrups, or elixirs for oral use, or in liquid forms which are suitable for injectable products. They can also be administered topically in the form of ointments, creams, lotions, and the like.

The novel compounds of this invention are prepared by reacting 2-azabicyclo[2.2.2]octane (I) [Schneider et al., Chem. Ber. 96, 2377 (1963)] or 3-azabicyclo[3.2.2] nonane (I) (Belgian Patent 608,905) with the appropriate lower-alkyl chloroformate, to obtain the corresponding lower-alkyl 2-azabicyclo[2.2.2]octane-2-carboxylate (II) and the corresponding lower-alkyl 3-azabicyclo[3.2.2]nonane-3-carboxylate (II), respectively. The reaction is preferably carried out in the presence of an inert solvent, for example benzene, toluene, diethyl ether, diisopropyl ether, tetrahydrofuran, dioxane, and the like. The reaction can be carried out at temperatures within the range of about 0° C. to about 150° C. Temperatures within the range of 20° C. to 100° C. are particularly advantageous. Stoichiometrically, the reaction requires one mole of amine for each mole of lower-alkyl chloroformate. However, the reaction produces one mole of hydrogen chloride, so an excess of the amine, preferably at least one mole excess, or another suitable acid acceptor, for example, triethylamine, pyridine, picoline, sodium hydroxide, and the like should be employed. The product thus obtained is recovered by conventional methods, for example, filtering off any solids, removing the solvent, washing, and distillation, preferably under reduced pressure.

The carboxylate (II) thus obtained is then subjected to ammonolysis with anhydrous or aqueous ammonia or to aminolysis with a primary or secondary amine to obtain the corresponding 2-carbamoyl-2-azabicyclo[2.2.2] octanes and 3-carbamoyl-3-azabicyclo[3.2.2]nonanes of Formula III. The ammonolysis and aminolysis reactions are carried out in accordance with methods well known in the art; see for example, Degering, An Outline of Organic Nitrogen Compounds, University Lithoprinters, Ypsilanti, Mich. (1945). Thus the selected carboxylate of Formula II is reacted with ammonia or with the appropriate primary or secondary amine, i.e., with a basic nitrogenous compound of the formula:

(IV)

wherein $R_1$ and $R_2$ have the meanings previously given. The reaction is preferably carried out in the presence of an inert solvent such as toluene, benzene, diethyl ether and the like, within a temperature range of from about 20° C. to about 150° C. When ammonia or a low boiling amine is used, the reaction is advantageously conducted in an autoclave. The product thus obtained can be recovered from the reaction mixture and purified by conventional methods, for example, the solvent can be evaporated and the residue thus obtained can be recrystallized from a suitable organic solvent such as ethyl acetate, alcohols, e.g., methyl, ethyl, propyl, isopropyl, and the like, pentane, hexane, petroleum ether, etc., or if the product is a liquid, it can be purified by distillation.

Alternatively, the compounds of Formula III, wherein $R_1$ is hydrogen and $R_2$ is lower-alkyl, are readily prepared by condensing 2-azabicyclo[2.2.2]octane (I) or 3-azabicyclo[3.2.2]nonane (I) with the appropriate lower-alkyl isocyanate to obtain a compound of the formula:

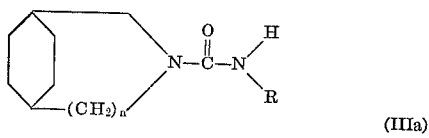
(IIIa)

wherein $n$ and R have the meanings hereinbefore given. The reaction is carried out by reacting the selected azabicyclo compound (I) with the appropriate lower-alkyl isocyanate in the presence of an inert organic solvent, for example, diethyl ether, diisopropyl ether, dioxane, benzene, toluene and the like. The reaction proceeds readily at temperatures between about 15° C. and about 150° C. The reflux temperature of the reaction mixture is conveniently employed in carrying out the reaction. The product is recovered by conventional methods such as concentration of the reaction mixture followed by recrystallization, distillation, etc.

Alternatively, the compounds of Formula III, other than those compounds wherein $R_1$ and $R_2$ are each hydrogen simultaneously, can be prepared by condensing 2-azabicyclo[2.2.2]octane (I) or 3-azabicyclo[3.2.2]nonane (I) with the appropriate carbamoyl halide of the formula:

(V)

wherein X is chlorine or bromine, $R_3$ is hydrogen or lower-alkyl, $R_4$ is lower-alkyl, and $R_3$ and $R_4$ taken together with —N< constitute a saturated heterocyclic amino radical as hereinbefore defined, to obtain the corresponding carbamoyl compounds represented by the following formula:

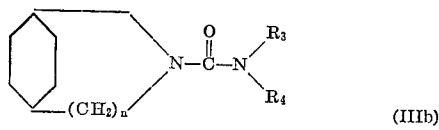
(IIIb)

wherein $n$, $R_3$ and $R_4$ have the meanings hereinbefore given. The reaction is carried out by reacting the selected azabicyclo compound (I) with the appropriate carbamoyl halide (V) in the presence of an inert organic solvent, for example, those listed in the immediately preceding paragraph. The reaction proceeds readily at temperatures between about 15° C. and about 150° C. The reflux temperature of the reaction mixture is conveniently employed in carrying out the reaction. The product is recovered by conventional methods such as filtration or concentration of the reaction mixture followed by filtration, washing, recrystallization, distillation, etc.

The following examples are illustrative of the products and processes of the present invention, but they are not to be construed as limiting.

Example 1.—Methyl 3-azabicyclo[3.2.2]nonane-3-carboxylate

A solution of 62.5 g. (0.5 mole) of 3-azabicyclo[3.2.2]nonane in 200 ml. of benzene was filtered to remove a small amount of insoluble solids and added with stirring and cooling during a period of 20 minutes to a solution of 23.6 g. (0.25 mole) of methyl chloroformate in 100 ml. of absolute diethyl ether. The temperature reached reflux and reflux was continued for 10 minutes after the addition was complete. The reaction mixture was then allowed to stand at room temperature for 3 days. Ice water was then added and the mixture was acidified with acetic acid. The organic and aqueous layers were separated and the aqueous layer was extracted with diethyl ether. The ether extract and original organic layer were combined and washed with water and saturated sodium chloride solution and then dried over sodium sulfate. After filtration the solvent was removed from the filtrate, giving 42.4 g. (92.7% yield) of methyl 3-azabicyclo[3.2.2]nonane-3-carboxylate as a colorless liquid, B.P. 132° C. (14 mm.); $n_D^{24}$ 1.4963.

*Analysis.*—Calcd. for $C_{10}H_{17}NO_2$: C, 65.54; H, 9.35; N, 7.64. Found: C, 65.48; H, 9.42; N, 7.58.

Following the procedure of Example 1, but substituting other lower-alkyl chloroformates in place of the methyl chloroformate used in Example 1, such as:

ethyl chloroformate,
propyl chloroformate,
isopropyl chloroformate,
butyl chloroformate,
sec.butyl chloroformate, and
tert.butyl chloroformate, there can be respectively obtained:

ethyl 3-azabicyclo[3.2.2]nonane-3-carboxylate,
propyl 3-azabicyclo[3.2.2]nonane-3-carboxylate,
ispropyl 3-azabicyclo[3.2.2]nonane-3-carboxylate,
butyl 3-azabicyclo[3.2.2]nonane-3-carboxylate,
sec.butyl 3-azabicyclo[3.2.2]nonane-3-carboxylate, and
tert.butyl 3-azabicyclo[3.2.2]nonane-3-carboxylate.

In the same manner following the procedure of Example 1, but substituting 2-azabicyclo[2.2.2]octane as starting material in place of the 3-azabicyclo[3.2.2]nonane and using methyl chloroformate and the other lower-alkyl chloroformates listed hereinabove, there can be respectively obtained:

methyl 2-azabicyclo[2.2.2]octane-2-carboxylate,
ethyl 2-azabicyclo[2.2.2]octane-2-carboxylate,
propyl 2-azabicyclo[2.2.2]octane-2-carboxylate,
isopropyl 2-azabicyclo[2.2.2]octane-2-carboxylate,
butyl 2-azabicyclo[2.2.2]octane-2-carboxylate,
sec.butyl 2-azabicyclo[2.2.2]octane-2-carboxylate, and
tert.butyl 2-azabicyclo[2.2.2]octane-2-carboxylate.

Example 2.—3-carbamoyl-3-azabicyclo[3.2.2]nonane

A solution of methyl 3-azabicyclo[3.2.2]nonane-3-carboxylate and ammonia in benzene can be heated in an autoclave at about 100° C. to obtain 3-carbamoyl-3-azabicyclo[3.2.2.]nonane.

Following the procedure of Example 2, but substituting in place of ammonia, primary and secondary amines of Formula IV such as:

methylamine,
ethylamine,
propylamine,
isopropylamine,
butylamine, sec.butylamine,
tert.butylamine,
dimethylamine,
diethylamine,
dipropylamine,
dibutylamine,
di-sec.butylamine,
di-tert.butylamine,
N-methylethylamine,
N-ethylpropylamine,
N-ethylbutylamine,
N-ethyl-sec.butylamine,
pyrrolidine,
2-methylpyrrolidine,
2,2-dimethylpyrrolidine,
piperidine,
2-methylpiperidine,
3-methylpiperidine,
4,4-dimethylpiperidine,
1-methylpiperazine,
morpholine,
2-methylmorpholine, and
3-methylmorpholine, there can be respectively obtained:

3-methylcarbamoyl-3-azabicyclo[3.2.2]nonane,
3-ethylcarbamoyl-3-azabicyclo[3.2.2]nanone,
3-propylcarbamoyl-3-azabicyclo[3.2.2]nonane,
3-isopropylcarbamoyl-3-azabicyclo[3.2.2]nonane,
3-butylcarbamoyl-3-azabicyclo[3.2.2]nonane,
3-sec.butylcarbamoyl-3-azabiclclo[3.2.2]nonane,
3-tert.butylcambamoyl-3-azabicyclo[3.2.2]nonane,
3-tert.butylcarbamoyl-3-azabicyclo[3.2.2]nonane,
3-diethylcarbamoyl-3-azabicyclo[3.2.2]nonane,
3-dipropylcarbamoyl-3-azabicylo[3.2.2]nonane,
3-dibutylcarbamoyl-3-azabicyclo[3.2.2]nonane,
3-di-sec.butylcarbamoyl-3-azabicyclo[3.2.2]nonane,
3-di-tert.butylcarbamoyl-3-azabicyclo[3.2.2]nonane,
3-(N-methylethylcarbamoyl)-3-azabicyclo[3.2.2]nonane,
3-(N-ethylpropylcarbamoyl)-3-azabicyclo[3.2.2]nonane,
3-(N-ethylbutylcarbamoyl)-3-azabicyclo[3.2.2]nonane,
3-(N-ethyl-sec.butylcarbamoyl)-3-azabicyclo[3.2.2]-
  nonane,
3-(pyrrolidinocarbonyl)-3-azabicyclo[3.2.2]nonane,
3-(2-methylpyrrolidinocarbonyl)-3-azabicyclo[3.2.2]-
  nonane,
3-(2,2-dimethylpyrrolidinocarbonyl)-3-azabicyclo-
  [3.2.2]nonane,
3-(piperidinocarbonyl)-3-azabicyclo[3.2.2]nonane,
3-(2-methylpiperidinocarbonyl)-3-azabicyclo[3.2.2]-
  nonane,
3-(3-methylpiperidinocarbonyl)-3-azabicyclo[3.2.2]-
  nonane,
3-(4,4-dimethylpiperidinocarbonyl)-3-azabicyclo[3.2.2]-
  nonane,
3-(4-methylpiperazinocarbonyl)-3-azabicyclo[3.2.2]-
  nonane,
3-(morpholinocarbonyl)-3-azabicyclo[3.2.2]nonane,
3-(2-methylmorpholinocarbonyl)-3-azabicyclo[3.2.2]-
  nonane, and
3-(3-methylmorpholinocarbonyl)-3-azabicyclo[3.2.2]-
  nonane, In the same manner following the procedure of Example 2, but substituting methyl 2-azabicyclo[2.2.2]octane-2-carboxylate in place of methyl 3-azabicyclo[3.2.2]-nonane 3-carboxylate and using ammonia and the primary and secondary amines of Formula IV hereinbefore listed there can be respectively obtained:

2-carbamoyl-2-azabicyclo[2.2.2]octane,
2-methylcarbamoyl-2-azabicyclo[2.2.2]octane,
2-ethylcarbamoyl-2-azabicyclo[2.2.2]octane,
2-propylcarbamoyl-2-azabicyclo[2.2.2]octane,
2-isopropylcarbamoyl-2-azabicyclo[2.2.2]octane,
2-butylcarbamoyl-2-azabicyclo[2.2.2]octane,
2-sec.butylcarbamoyl-2-azabicyclo[2.2.2]octane,
2-tert.butylcarbamoyl-2-azabicyclo[2.2.2]octane,
2-dimethylcarbamoyl-2-azabicyclo[2.2.2]octane,
2-diethylcarbamoyl-2-azabicyclo[2.2.2]octane,
2-dipropylcarbamoyl-2-azabicyclo[2.2.2]octane,
2-dibutylcarbamoyl-2-azabicyclo[2.2.2]octane,
2-di-sec.butylcarbamoyl-2-azabicyclo[2.2.2]octane,
2-di-tert.butylcarbamoyl-2-azabicyclo[2.2.2]octane,
2-(N-methylethylcarbamoyl)-2-azabicyclo[2.2.2.]octane,
2-(N-ethylpropylcarbamoyl)-2-azabicyclo[2.2.2]octane,
2-(N-ethylbutylcarbamoyl)-2-azabiclclo[2.2.2]octane,
2-(N-ethyl-sec.butylcarbamoyl)-2-azabicyclo[2.2.2]-
  octane,
2-(pyrrolidinocarbonyl)-2-azabicyclo[2.2.2]octane,
2-(2-methylpyrrolidinocarbonyl)-2-azabicyclo[2.2.2]-
  octane,
2-(2,2-dimethylpyrrolidinocarbonyl)-2-azabicyclo-
  [2.2.2]octane,
2-(piperidinocarbonyl)-2-azabicyclo[2.2.2]octane,
2-(2-methylpiperidinocarbonyl)-2-azabicyclo[2.2.2]-
  octane,
2-(3-methylpiperidinocarbonyl)-2-azabicyclo[2.2.2]-
  octane,
2-(4,4-dimethylpiperidinocarbonyl)-2-azabicyclo[2.2.2]-
  octane,
2-(4-methylpiperazinocarbonyl)-2-azabicyclo[2.2.2]-
  octane,
2-(morpholinocarbonyl)-2-azabicyclo[2.2.2]octane,
2-(2-methylmorpholinocarbonyl)-2-azabicyclo[2.2.2]-
  octane, and
2-(3-methylmorpholinocarbonyl)-2-azabicyclo[2.2.2]-
  octane.

Similarly, other lower-alkyl 3-azabicyclo[3.2.2]nonane-3-carboxylates and lower-alkyl 2-azabicyclo[2.2.2]octane-2-carboxylates, such as those named in Example 1, above, can be substituted as starting material in place of methyl 3-azabicyclo[3.2.2]nonane-3-carboxylate and methyl 2-azabicyclo[2.2.2]octane-2-carboxylate, respectively, to obtain the above listed 3-carbamoyl-3-azabicyclo[3.2.2]-nonanes and 2-carbamoyl-2-azabicyclo[2.2.2]octanes.

Example 3.—3-methylcarbamoyl-3-azabicyclo-
[3.2.2]nonane

A solution of 12.5 g. (0.1 mole) of 3-azabicyclo-[3.2.2]nonane in 50 ml. of toluene was filtered to remove a small amount of insoluble solid and then 8.5 g. (0.15 mole) of methyl isocyanate was slowly added with stirring. The temperature rose to about 87° C. After stirring for 2 hours at room temperature, refluxing for 1 hour, and standing overnight, the solution was evaporated to dryness below 60° C. in vacuo, giving 18.5 g. of solid. The solid thus obtained was recrystallized twice from ethyl acetate (filtering hot each time to remove some insoluble solid material), and then from aqueous isopropyl alcohol, giving 7.74 g. of 3-methylcarbamoyl-3-azabicyclo[3.2.2]nonane, M.P. 127–128.5° C. An additional 2.86 g. of 3-methylcarbamoyl-3-azabicyclo[3.2.2]nonane was recovered from the filtrate; total yield 10.60 g. (58% yield).

*Analysis.*—Calcd. for $C_{10}H_{18}N_2O$: C, 65.89; H, 9.96; N, 15.37. Found: C, 65.48; H, 10.02; N, 15.31.

Following the procedure of Example 3, but substituting in place of methyl isocyanate other lower - alkyl isocyanates such as:

ethyl isocyanate,
propyl isocyanate,
isopropyl isocyanate,
butyl isocyanate,
sec. butyl isocyanate, and
tert. butyl isocyanate, the corresponding 3 - lower-alkylcarbamoyl-3-azabicyclo-[3.2.2] innonanes of Formula IIIa can be respectively obtained.

In the same manner following the procedure of Example 3, but substituting 2 - azabicyclo[2.2.2]octane as starting material in place of 3-azabicyclo[3.2.2]nonane and using methyl isocyanate and the other lower-alkyl isocyanates set forth above, the corresponding 2 - lower-alkylcarbamoyl - 2 - azabicyclo[2.2.2]octanes of Formula IIIa can be obtained.

Example 4.—3-dimethylcarbamoyl-3-azabicyclo-[3.2.2]nonane

A solution of 26.2 g. (0.21 mole) of 3 - azabicyclo-[3.2.2]nonane in 100 ml. of benzene was filtered to remove a small amount of insoluble solid material. Dimethylcarbamoyl chloride (10.7 g.; 0.1 mole) was slowly added with stirring to the filtered solution. The temperature rose to reflux. After refluxing for 3 hours, the reaction mixture was cooled, ice water was added, and the mixture was acidified. The organic and aqueous layers were separated and the aqueous layer was extracted with diethyl ether. The ether extract and original organic layer were combined, washed with water and saturated sodium chloride solution, and dried over sodium sulfate. Filtration and removal of the solvent gave 19.95 g. of oil which crystallized on cooling; M.P. 47–50° C. Recrystallization of the product from pentane gave 13.5 g. (63.5% yield) of 3 - dimethylcarbamoyl - 3 - azabicyclo[3.2.2]nonane, M.P. 53–55° C.

*Analysis.*—Calcd. for $C_{11}H_{20}N_2O$: C, 67.30; H, 10.27; N, 14.27. Found: C, 67.22; H, 9.79; N, 14.55.

Following the procedure of Example 4, but substituting in place of dimethylcarbamoyl chloride other di-lower-alkylcarbamoyl chlorides or bromides or heterocyclicaminocarbonyl chlorides or bromides of Formula V, such as:

diethylcarbamoyl bromide,
dipropylcarbamoyl chloride,
dibutylcarbamoyl chloride,
di-sec.butylcarbamoyl chloride,
N-methylethylcarbamoyl chloride,
pyrrolidinocarbonyl bromide,
2-methylpyrrolidinocarbonyl chloride,
piperidinocarbonyl chloride,
3-methylpiperidinocarbonyl chloride,
4-methylpiperazinocarbonyl chloride,
morpholinocarbonyl chloride,
2-methylmorpholinocarbonyl bromide, and the like, there can be obtained the corresponding 3-di-lower-alkyl-carbamoyl - 3 - azabicyclo[3.2.2]nonanes and 3-heterocyclicaminocarbonyl - 3 - azabicyclo[3.2.2]nonanes of Formula IIIb.

In the same manner following the procedure of Example 4, but substituting 2-azabicyclo[2.2.2]octane as the starting material in place of 3 - azabicyclo[3.2.2] nonane and using the appropriate di-lower-alkylcarbamoyl chloride or bromide or heterocyclicaminocarbonyl chloride or bromide of Formula V such as those named hereinabove, the corresponding 2 - di - lower-alkylcarbamoyl - 2 - azabicyclo[2.2.2]octanes and 2-heterocyclicaminocarbonyl - 2 - azabicyclo[2.2.2]octanes of Formula IIIb can be obtained.

I claim:
1. A compound of the formula:

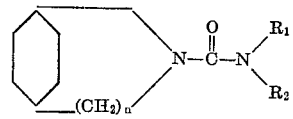

wherein $n$ is 0 or 1, and $R_1$ and $R_2$ taken separately, are each hydrogen or methyl.

2. 3 - methylcarbamoyl - 3 - azabicyclo[3.2.2]nonane, a compound of claim 1, wherein $n$ is 1, $R_1$ is hydrogen and $R_2$ is methyl.

3. 3 - dimethylcarbamoyl - 3 - azabicyclo[3.2.2] nonane, a compound of claim 1, wherein $n$ is 1, $R_1$ is methyl and $R_2$ is methyl.

References Cited

UNITED STATES PATENTS 2,965,638  12/1960  Schindler et al. ____ 260—239

OTHER REFERENCES

Brown et al., I. & E. C. Product Research and Development, vol. 4, pp. 45–47 (1965).

ALTON D. ROLLINS, *Primary Examiner.*

U.S. Cl. X.R.

260—294, 326.3, 268, 247.2, 999, 397.4